(12) United States Patent
Gonzalez et al.

(10) Patent No.: US 11,147,299 B2
(45) Date of Patent: *Oct. 19, 2021

(54) READY-TO-EAT CEREAL COMPOSITION

(71) Applicant: General Mills, Inc., Minneapolis, MN (US)

(72) Inventors: Tanhia D. Gonzalez, Saint Louis Park, MN (US); David C. Gonzalez, Saint Louis Park, MN (US); Christine Ng, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,053

(22) Filed: Apr. 22, 2020

(65) Prior Publication Data

US 2020/0245657 A1 Aug. 6, 2020

Related U.S. Application Data

(63) Continuation of application No. 15/548,893, filed as application No. PCT/US2017/017217 on Feb. 9, 2017, now Pat. No. 10,660,353.

(51) Int. Cl.
*A23L 7/135* (2016.01)
*A21D 2/18* (2006.01)
*A21D 2/16* (2006.01)
*A23L 7/126* (2016.01)

(52) U.S. Cl.
CPC .............. *A23L 7/135* (2016.08); *A21D 2/165* (2013.01); *A21D 2/181* (2013.01); *A21D 2/186* (2013.01); *A23L 7/126* (2016.08); *A23V 2002/00* (2013.01)

(58) Field of Classification Search
USPC ................................................ 426/620, 619
See application file for complete search history.

(56) References Cited

U.S. PATENT DOCUMENTS

| 4,650,685 A | 3/1987 | Persson et al. |
| 5,024,996 A | 6/1991 | Ringe |
| 5,093,146 A * | 3/1992 | Calandro ............. A23L 29/212 426/549 |
| 5,695,805 A | 12/1997 | Borek et al. |

(Continued)

FOREIGN PATENT DOCUMENTS

| CN | 101793846 | 8/2010 |
| CN | 106035549 | 10/2016 |

(Continued)

OTHER PUBLICATIONS

Robinson, "*Nutrition Information for Oat Flour*", http://web.archive.org/web/20110131142148/https://www.livestrong.com/article/258791-nutritution-information-for-oat-flour/, pp. 1-2, (Jun. 16, 2020).

(Continued)

*Primary Examiner* — Lien T Tran
(74) *Attorney, Agent, or Firm* — Diederiks & Whitelaw, PLC; John L. Crimmins, Esq.

(57) ABSTRACT

Provided herein is a ready-to-eat (RTE) breakfast cereal with a unique texture. A RTE breakfast cereal provided herein can have a high slowly digestible starch content relative to commercially available RTE cereals. Also disclosed are methods of making a RTE breakfast cereal described herein.

15 Claims, 2 Drawing Sheets

(56) References Cited

U.S. PATENT DOCUMENTS

Figure 1:
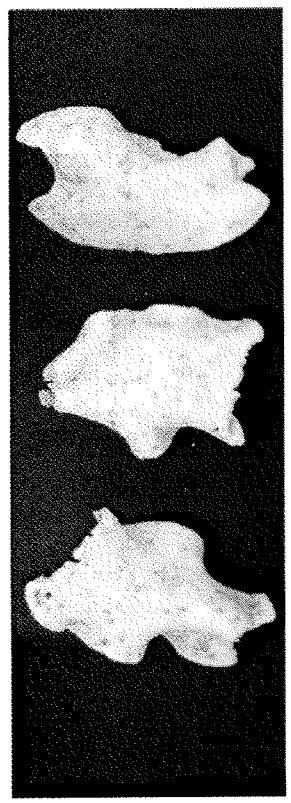

| | | |
|---|---|---|
| 5,709,902 A * | 1/1998 | Bartolomei ............ A23L 7/122 426/293 |
| 6,287,621 B1 | 9/2001 | Lacourse et al. |
| 6,291,008 B1 | 9/2001 | Robie et al. |
| 6,723,358 B1 | 4/2004 | van Lengerich |
| 2002/0058089 A1 | 5/2002 | Burri et al. |
| 2003/0215562 A1 | 11/2003 | Shi et al. |
| 2003/0219520 A1 | 11/2003 | Shi et al. |
| 2006/0204597 A1 | 9/2006 | Bird et al. |
| 2006/0257977 A1 | 11/2006 | Hamaker et al. |
| 2007/0134392 A1 | 6/2007 | Muller et al. |
| 2007/0134398 A1 | 6/2007 | Pouru et al. |
| 2010/0092639 A1 * | 4/2010 | Upreti ................... A21D 6/003 426/549 |
| 2014/0220186 A1 | 8/2014 | Wahl et al. |
| 2015/0037469 A1 | 2/2015 | Folz et al. |

FOREIGN PATENT DOCUMENTS

| | | |
|---|---|---|
| EP | 512249 | 11/1992 |
| WO | WO 2007/022198 | 2/2007 |
| WO | WO 2012/120156 | 9/2012 |

OTHER PUBLICATIONS

Anderson et al., "*Use of Phytoglycogen Extracted from Corn to Increase the Bowl-Life of Breakfast Cereals*", Journal of Food Process Engineering. No. 26, pp. 315-322, 2003.

Vinoy et al., "*Slow-Release Carbohydrates: Growing Evidence on Metabolic Responses and Public Health Interest. Summary of the Symposium Held at the 12$^{th}$ European Nutrition Conference*", Food & Nutrition Research, No. 60, pp. 1-10, 2016.

Vinoy et al., "*Authorised EU Health Claim for Slowly Digestible Starch*", Foods, Nutrients and Food Ingredients with Authorised EU Health Claims, http://dx.doi.org/10.1016/B978-1-78242-382-9.00003-7, 2015.

\* cited by examiner

READY-TO-EAT CEREAL COMPOSITION

CROSS-REFERENCE TO RELATED APPLICATIONS

This application represents a continuation application of application Ser. No. 15/548,893 filed Aug. 4, 2017 Now U.S. patent Ser. No. 10/660,353 entitled "Ready-To-Eat Cereal Composition" which represents a National Stage application of PCT/US2017/017217 entitled "Ready-To-Eat Cereal Compositions" filed Feb. 9, 2017, pending. The entire content of these applications is incorporated by reference.

BACKGROUND

Consumers are more frequently looking for foods that have a greater nutritional benefit, and avoiding foods that are perceived to have a negative impact on health. Consumers are increasingly skeptical of whether ready-to-eat foods can meet nutritional and functional expectations. One particular function desired in ready-to-eat foods is the ability of such foods to help consumers maintain a stable blood glucose level, since spikes and valleys in blood glucose levels can affect energy level and health. One component of foods that can help provide a stable blood glucose level includes slowly digestible starch (SDS), which is a source of slowly accessible glucose (SAG). Some grain-based foods can have difficulty in helping maintain a stable blood glucose level because the grain starches in such foods are often gelatinized during cooking, which reduces the SAG content of these foods. Consumers who enjoy traditionally grain-based foods, yet want the benefit of a food that can help maintain stable blood glucose levels are interested in having more options for their diets.

SUMMARY

Ready-to-eat (RTE) breakfast cereal compositions are provided herein. A RTE breakfast cereal composition includes breakfast cereal pieces. In some embodiments, the breakfast cereal pieces can have flour in an amount of at least 64% by dry weight, sugar in an amount of at least about 8% by dry weight, an oil in an amount of about 3% to about 8% by dry weight, a slowly digestible starch (SDS) content that is at least 10% by dry weight of the pieces, where the SDS content is at least 20% of the total available carbohydrates in the pieces, and a piece density from about 1.00 g/cc to about 1.30 g/cc and the pieces take up less than 50% water by weight at 60 seconds as measured by a bowl life test.

In some embodiments, an RTE breakfast cereal composition can include breakfast cereal pieces that include oat flour in an amount of at least 70% by dry weight.

In some embodiments, an RTE breakfast cereal composition can include breakfast cereal pieces that have an average breaking force of up to about 1000 g, and having a piece density from about 1.00 g/cc to about 1.30 g/cc or a bulk density from about 300 g per 100 cubic inches to about 800 g per 100 cubic inches.

In some embodiments, breakfast cereal pieces of a RTE breakfast cereal composition provided herein can have a bulk density from about 300 g per 100 cubic inches to about 800 g per 100 cubic inches.

In some embodiments, breakfast cereal pieces of a RTE breakfast cereal composition provided herein can have a first peak between 67° C. and 71° C. as measured by differential scanning calorimetry (DSC). In some embodiments, the first peak can have an area greater than 60 mJ.

In some embodiments, breakfast cereal pieces of a RTE breakfast cereal composition provided herein can have a weight of from weight of less than 1 gram per piece.

In some embodiments, breakfast cereal pieces of a RTE breakfast cereal composition provided herein can have an average breaking force of from about 300 g to about 1000 g.

In some embodiments, breakfast cereal pieces of a RTE breakfast cereal composition provided herein can include a heat sensitive component. In some embodiments, a heat sensitive component can be a polyunsaturated fat, a vitamin, a phytonutrient, or a beneficial microorganism.

Also provided herein are methods for making RTE breakfast cereal pieces. A method can include the steps of combining ingredients including a flour in an amount of at least 60% by dry weight, an oil in an amount of from 3% to 8% by dry weight, a leavener in an amount of from about 1% to about 2% by dry weight, a sugar in an amount of at least 8% by dry weight, and water, mixing the ingredients at a temperature between about 10° C. and 70° C. to produce a leavened dough having a moisture content of from about 20% to 28%, forming the leavened dough into pieces, and drying the pieces to produce RTE breakfast cereal pieces having a moisture content of less than 12%. Ingredients can be mixed in an extruder or a batch mixer.

In some embodiments, RTE breakfast cereal pieces can have a moisture content of from 8% to about 11%.

In some embodiments, a method for making RTE breakfast cereal pieces can include a step of drying the pieces at a temperature greater than 100° C. to produce RTE breakfast cereal pieces having a moisture content of less than 8%.

In some embodiments of a method for making RTE breakfast cereal pieces, pieces can be dried at an air temperature of less than 110° C.

In some embodiments of a method for making RTE breakfast cereal pieces, the RTE breakfast cereal pieces can have a piece density from about 1.00 g/cc to about 1.30 g/cc, and a weight of from about 0.10 g to 0.80 g per piece.

In some embodiments of a method for making RTE breakfast cereal pieces, the RTE breakfast cereal pieces can have a bulk density from bulk density from about 300 g per 100 cubic inches to about 800 g per 100 cubic inches, and a weight of from about 0.10 g to about 0.80 g per piece.

In some embodiments of a method for making RTE breakfast cereal pieces, the RTE breakfast cereal pieces can have a slowly digestible starch (SDS) content that is at least 10% by dry weight of the pieces, where the SDS content is at least 20% of the total available carbohydrates in the pieces.

In some embodiments of a method for making RTE breakfast cereal pieces, flour and oil can be combined before adding water.

In some embodiments of a method for making RTE breakfast cereal pieces, a forming step can be performed using a die.

In some embodiments of a method for making RTE breakfast cereal pieces, a forming step can be performed without the use of a roller.

In some embodiments of a method for making RTE breakfast cereal pieces, flour can be heat treated prior to the combining step.

Also provided is a food product. A food product, includes a RTE breakfast cereal composition provided herein, and further includes at least one additional food ingredient. In some embodiments, a food product can be a snack bar. In some embodiments, breakfast cereal pieces of a RTE breakfast cereal composition provided herein can be included in a food product as agglomerated pieces.

These and various other features and advantages will be apparent from a reading of the following detailed description.

DRAWINGS

FIG. 1 shows a photograph of pieces of a RTE cereal, according to an embodiment provided herein.

Figure 2:
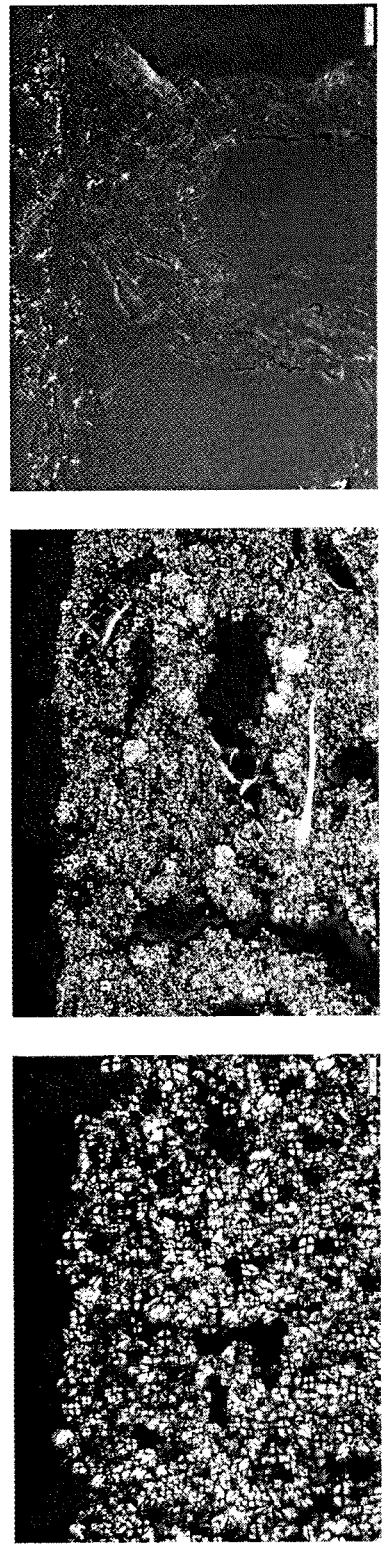

FIG. 2 shows polarized light micrographs of pieces of a RTE cereal containing wheat flour showing birefringence of ungelatinized starch, according to an embodiment provided herein (left image), pieces of a RTE cereal containing oat flour showing ungelatinized starch, according to another embodiment provided herein (middle image), and a commercially available corn flake RTE cereal showing little to no ungelatinized starch (right image).

DETAILED DESCRIPTION

Ready-to-eat (RTE) breakfast cereal is a food item that can be eaten during many eating occasions, including breakfast, lunch, dinner, and snacking occasions. Most manufacturing processes for making RTE breakfast cereals lead to full gelatinization of starches within the product, a characteristic that provides desirable flavor and texture properties to these products. However, starch gelatinization reduces slowly digestible starch (SDS) content and increases rapidly digestible starch (RDS) content, which is more rapidly converted to glucose in the body than ungelatinized starch. It is, then, a challenge to make RTE breakfast cereal with an increased SDS content while also providing an enjoyable eating experience. Further, since RTE cereals are generally desired to be shelf stable for extended periods of time, they must be dried before packaging, and drying techniques can facilitate further gelatinization of starches, especially since RTE cereal pieces tend to be small enough for heat from drying equipment to facilitate gelatinization throughout the pieces. Thus, an additional challenge is to provide an RTE breakfast cereal with an increased SDS content and with the expected shelf life of a traditional RTE breakfast cereal.

Previous methods and products that were designed to reduce starch gelatinization, such as those described in PCT Publication WO 2012/120156 or sold under the brand name belVita (Mondelez International), are not suitable for use as a RTE breakfast cereal because they rely on larger piece size than expected for a RTE breakfast cereal to achieve the desired results, produce a texture that is not consistent with a RTE breakfast cereal, and do not produce a product that has sufficient bowl life such that it retains a desirable texture in milk (a common way for consumers to eat RTE breakfast cereal).

However, described herein is a discovery of a method that can produce a uniquely textured RTE breakfast cereal composition that can include an elevated level of SDS as compared to currently available RTE breakfast cereals. In some embodiments, a RTE breakfast cereal composition provided herein includes breakfast cereal pieces with a slowly available glucose (SAG) content of at least 12% (e.g., at least 14% or at least 18%) by dry weight. In some embodiments, a RTE breakfast cereal composition provided herein includes breakfast cereal pieces with an SDS content of at least 10% (e.g., at least 12%) by dry weight of the pieces as measured using the Englyst method.

As used herein, the term "Englyst Method" refers to an in vitro methodology developed by Englyst and others (Englyst et al., 1992, Eur. J. Clin. Nutr. 46 (Suppl. 2), 33-50) to classify starch based on its digestibility. The Englyst Method determines the amount of glucose released after a sample of interest is incubated with a combination of digestive enzymes (i.e. amylases, amyloglucosidases, invertases, etc.). The amount of glucose released after 20 minutes (G20) is denominated rapidly available glucose (RAG). The glucose released between 20 and 120 minutes (G120-G20) is denominated slowly available glucose (SAG). Slowly digestible starch (SDS) is calculated by multiplying slowly available glucose (SAG) by 0.9 (Englyst et al., 1992, Eur. J. Clin. Nutr. 46 (Suppl. 2), 33-50).

In some embodiments, a RTE breakfast cereal composition provided herein includes breakfast cereal pieces with an SDS content of at least 20% (e.g., at least 21%) by dry weight basis in the pieces.

In some embodiments, a RTE breakfast cereal composition provided herein includes breakfast cereal pieces with an SDS content of at least 25% (e.g., at least 26%) by weight of the total starch content in the pieces. Percent SDS by weight of total starch is calculated by dividing the SDS content by dry weight by total starch content by dry weight.

In some embodiments, a RTE breakfast cereal composition can contain an amount of ungelatinized starch. Ungelatinized starch can be visualized by polarized light microscopy (PLM). Ungelatinized starch granules can appear bright and/or birefringent regions under PLM as can be seen in FIG. 2 (left and middle images), often resembling a Maltese cross-like pattern if birefringence is apparent, as can be seen in FIG. 2 (left image).

The amount of ungelatinized starch in a RTE breakfast cereal can be analyzed using differential scanning calorimetry (DSC). Briefly, DSC as used to measure ungelatinized starch in a RTE breakfast cereal, includes measuring a 10 mg sample on a dry weight basis, combining with 20 mg water, and allowing the combination to hydrate in a sealed pan for a minimum of 1 hour at room temperature. The sample is then tested using a differential scanning calorimeter (e.g., Perkin Elmer Diamond DSC) set to analyze the sample with the following profile: ramp 40° C./min to 0.00° C., Isothermal 1.0 min, ramp 10° C./min to 200° C. In some embodiments a RTE breakfast cereal composition provided herein can include pieces that have a peak between 67° C. and 71° C. as determined by DSC. In some embodiments, a peak between 67° C. and 71° C. can have an area greater than 60 mJ for samples that contain about 45-60% starch on a dry weight basis. In some embodiments, a RTE breakfast cereal provided herein can include pieces that have at least one additional peak at a temperature greater than 71° C. as determined by DSC.

A RTE breakfast cereal provided herein includes at least 60% (e.g., at least 64% or at least 70%) by dry weight flour. Any flour, or combination of flours, that includes an amount of starch, such as a grain flour (e.g., wheat flour, oat flour, barley flour, corn flour, and the like), seed flour (e.g., quinoa flour, sunflower seed flour, amaranth flour, and the like), or vegetable flour (e.g., potato flour, tapioca flour, and the like), is suitable for use in a RTE breakfast cereal provided herein. Some flours, such as oat flour, have starch that is particularly easily gelatinized. Yet, the presently described RTE breakfast cereal can contain a significant amount of oat flour, even all of its flour content being oat flour, while still having an elevated SDS content.

A RTE breakfast cereal provided herein can also contain sugar. Sugar can contribute to texture and structure of a RTE breakfast cereal provided herein. For example, sugar can contribute sweetness, as well as provide a matrix for retaining natural and added flavors in RTE breakfast cereal. In another example, sugar can contribute to crystalline structure within RTE cereal to provide desired density and/or mouthfeel. Sugar can also contribute to color and flavor by participating in Maillard and caramelization reactions during production. Sugar can also may also contribute to extended bowl life.

In addition, sugar can aid in manufacture of a RTE breakfast cereal provided herein. For example, sugar can act as a plasticizer and/or binder in a dough matrix during manufacture, which can help achieve a desired shape for RTE breakfast cereal pieces. In another example, sugar can minimize stickiness during the drying process, which can reduce unintentional agglomeration of RTE breakfast cereal pieces. Sugar can also contribute to shelf life by reducing water activity. Sugar can be included in a RTE breakfast cereal provided herein in an amount of at least 8% by dry weight (e.g., from about 8% to about 15%). In some embodiments, additional sugar can be included in a coating on dried RTE breakfast cereal pieces.

In some embodiments, a RTE breakfast cereal can also include an oil. Oil can contribute to texture and structure of a RTE breakfast cereal provided herein. For example, an oil can contribute to reduced hardness in the texture of a RTE breakfast cereal. In another example, oil can affect the texture by reducing the development of a gluten network in formulations that include gluten. Oil can also contribute to a desired airy texture, as well.

In addition, oil can aid in manufacture of a RTE breakfast cereal provided herein. For example, oil can reduce mechanical shear and/or heat generation during mixing of ingredients used to make a RTE breakfast cereal, which can reduce gelatinization of starch. In another example, oil can provide lubrication during extrusion and forming, and reduce stickiness during manufacture. In addition, in some embodiments, an oil can be combined with a flour and/or sugar prior to the addition of water during production of a RTE cereal, which can reduce access of water to starch granules and reduce gelatinization of starch. Addition of oil prior to addition of water might be useful to allow the use of higher temperatures during manufacture of a RTE cereal, which can be used to increase food safety. Oil can be included in a RTE breakfast cereal provided herein in an amount of from about 3% to about 8% by dry weight.

Other ingredients can be included in a RTE breakfast cereal provided herein to provide a desired flavor, appearance, and/or nutritional profile. For example, flavorants (e.g., vanilla extract, cocoa, cinnamon, artificial flavors, and the like), colorants (e.g., natural colorants such as beet juice, cocoa, cochineal extract, and the like, or artificial colorants such as FD&C dyes), and/or inclusions (e.g., nut pieces, grain pieces, rolled oats, dried fruit, and the like) can be included in a RTE breakfast cereal provided herein. In some embodiments, a RTE breakfast cereal can include a heat sensitive component, such as a heat sensitive flavorant, a heat sensitive colorant, a heat sensitive vitamin, a polyunsaturated fatty acid (PUFA), an amino acid, a phenolic compound, a beneficial microorganism (e.g., a probiotic), a resistant starch, or a phytonutrient (e.g., a flavonoid). Such a heat sensitive component can retain functionality in a RTE breakfast cereal provided herein.

In some embodiments, a RTE breakfast cereal provided herein can have a bowl life comparable to available RTE breakfast cereals. In some embodiments, a RTE breakfast cereal provided herein can have a bowl life that is superior to available products that were designed to reduce starch gelatinization, such as those described in PCT Publication WO 2012/120156 or sold under the brand name belVita (Mondelez International). Surprisingly, a bowl life of a RTE breakfast cereal provided herein can be superior, even in the absence of any separately applied coating, such as a sugar coating. For example, a RTE breakfast cereal provided herein can include RTE breakfast cereal pieces that take up less than 50% (e.g., less than 40%) water by weight at 60 seconds as measured by a bowl life test.

As used herein, a bowl life test is performed by combining about 50 g of intact pieces with about 400 g water at room temperature, draining free water by holding and shaking the pieces in a strainer until no more dripping water is visible (about 15-20 seconds) from the pieces and weighing the pieces at various time points (e.g., 30 seconds, 60 seconds, and 120 seconds). The percent increase in weight over the original weight of the breakfast cereal pieces is the percent water by weight taken up. That is, if 50.3 g of RTE breakfast cereal pieces weigh 60.1 g at 30 seconds after draining free water, then the RTE breakfast cereal pieces took up 19% ((60.1−50.3)/50.3*100) by weight water at 30 seconds. Bowl life of other products, such as such as those described in PCT Publication WO 2012/120156 or sold under the brand name belVita (Mondelez International), can be compared using a similar method using intact pieces of such products.

In some embodiments, a RTE breakfast cereal provided herein can have a piece density of from about 1.00 g/cc to about 1.30 g/cc. In some embodiments, a RTE breakfast cereal provided herein can have a bulk density of from about 300 g per 100 cubic inches to about 800 g per 100 cubic inches. Bulk density can vary based on shape of the pieces that comprise a RTE breakfast cereal. Regardless of shape, however, pieces that comprise a RTE breakfast cereal provided herein should be suitable for use as a RTE breakfast cereal. That is, pieces comprising a RTE breakfast cereal should be relatively small as compared to a cookie or biscuit, and preferably fit on a spoon commonly used for eating RTE cereals (e.g., a tea spoon or a soup spoon). For example, a RTE breakfast cereal can include pieces that are less than 1 g per piece (e.g., from about 0.10 g to 0.80 g per piece, or from about 0.2 g to 0.67 g per piece).

A RTE breakfast cereal provided herein includes pieces that have a moisture content of less than 12% (e.g., less than 8%, or from about 4% to about 7%). A low moisture content can provide a RTE breakfast cereal an extended shelf life without significant loss in flavor, texture, nutritional profile, and/or food safety. A RTE breakfast cereal provided herein can have a shelf life of at least 6 months (e.g., at least 12 months) at room temperature.

The texture of a RTE breakfast cereal provided herein can be described as crispy, crunchy, and slightly tooth-packing, but not hard, and disintegrating easily upon chewing. In some embodiments, a RTE breakfast cereal provided herein retains a similar texture for an extended period of time during the bowl life. In some embodiments, texture of a RTE breakfast cereal provided can be correlated to measurements of breaking force of RTE breakfast cereal pieces. In order to determine breaking force of RTE breakfast cereal pieces, a single RTE breakfast cereal piece is placed on the circular support of an HDP/CFS Crisp Fracture Support Rig (Stable Micro Systems, Ltd., Surrey, United Kingdom) mounted on a TA-XT plus Texture Analyzer (Stable Micro Systems). A TA-8 (¼") probe is pressed downward onto the piece using the following settings on the TA-XT plus Texture Analyzer: Test Mode: Compression, Pre-Test Speed: 2.0 mm/sec, Test Speed: 2.0 mm/sec, Post-Test Speed: 10.00 mm/sec, T.A. Variable No: 5: 0.0 g, Target Mode: Distance, Distance: 10 mm, Strain: 10.0%, Trigger Type: Auto (Force), Trigger Force: 5.0 g, Probe HDP/CFS; CRISP FRACTURE SUP- PORT, Batch: TESTSpeed, Points per second: 500. Breaking force is the average peak force measured in grams over at least three measurements. A RTE breakfast cereal provided herein can have pieces with an average breaking force of up to about 1000 g (e.g., from about 200 g to about 1000 g, or from about 300 g to about 900 g). Such a unique texture can be enjoyed even in the absence of an elevated SDS content. Breaking force of a RTE breakfast cereal provided herein can be more similar to currently available flake type RTE breakfast cereals, but less than that of products such as product sold under the brand name belVita or dried wheat pasta. Breaking force of other products, such as such as those described in PCT Publication WO 2012/120156 or sold under the brand name belVita, can be compared using a similar method.

Methods of making a RTE breakfast cereal are also provided herein. A method provided herein can contribute to texture, an elevated SDS content, and/or the ability to include heat sensitive components in a RTE breakfast cereal. Generally, a method provided herein includes forming a leavened dough having a moisture content of from about 20% to about 28% into pieces, and then drying the pieces to produce RTE breakfast cereal pieces.

As used herein, the term "leavened" refers to the inclusion of air bubbles in the dough. Leavening can be caused in any appropriate manner. For example, in some embodiments, a chemical leavening system (e.g., baking powder, baking soda/cream of tartar, or other food safe leavening acid/base system) can be combined with other ingredients, including flour and water, to produce a leavened dough. If a chemical leavener is included, it can be included in an amount of from about 1% to 2% by dry weight of the ingredients. In some embodiments, air can be introduced by forcing air into the dough during mixing rather than using a chemical leavener. Leavening contributes to a desired density and a unique texture of a RTE breakfast cereal provided herein. Thus, leavening should be sufficient to produce RTE breakfast cereal food pieces at the desired piece density.

A leavened dough can be produced by combining ingredients in any appropriate manner. For example, a leavened dough can be produced in a mixer (e.g., a batch mixer) or in an extruder (e.g., a single screw extruder or a twin screw extruder) by combining dry ingredients, oil, and sufficient water to arrive at a moisture content of from about 20% to about 28%. Ingredients can be combined in any order. However, in some embodiments, an oil may be combined with a flour prior to addition of water, as described above, to reduce interaction of starch in the flour with water, and thus reducing starch gelatinization even if temperatures sufficient for starch gelatinization are reached during manufacture of RTE breakfast cereal pieces. In some embodiments, dry ingredients, such as flour, sugar, and/or a chemical leavening system, can be combined to produce a pre-mix prior to the addition of non-dry ingredients, such as oil and/or water to form a leavened dough.

In some embodiments, temperature of a leavened dough can be controlled during mixing and/or forming of pieces to reduce starch gelatinization. For example, ingredients can be mixed at a temperature of 70° C. or less (e.g., from about 10° C. to about 70° C.) in a temperature controlled extruder. A method that includes temperature control during mixing and/or forming of pieces may be desired if temperature sensitive components are to be included in a RTE breakfast cereal. In some embodiments, ingredients that have been treated to reduce food safety risk, such as heat-treated or chlorine treated flour, may be used if temperatures used during manufacture of RTE breakfast cereal pieces are not sufficient to kill potential pathogens.

A leavened dough can be formed into pieces in any appropriate manner. For example, a leavened dough can be formed into pieces by extruding the dough through a die and cutting, pinching, or pulling the extruded dough into pieces. In some embodiments, pieces can be formed using a roller that presses the leavened dough into a sheet, followed by cutting the sheet. In still other embodiments, a leavened dough can be cut, pinched, or pulled into pieces and then formed using a roller or die.

Generally, the pieces do not expand, or puff, significantly during formation. Expansion can be reduced or prevented by maintaining a pressure during mixing that is similar to the pressure during forming of pieces.

Formed dough pieces can be dried to achieve a desired moisture content to form RTE breakfast cereal pieces. Drying can be performed using any appropriate process and/or equipment. For example, formed dough pieces can be subjected to forced air drying (e.g., fluidized bed drying), oven drying (e.g., standard or convection), infrared heating, or the like, to achieve the desired moisture content. In some embodiments, formed dough pieces can be subjected to multiple drying techniques to achieve the desired moisture content. For example, formed dough pieces can be subjected to oven drying, followed by fluidized bed drying.

Preferably, the drying process does not result in RTE breakfast cereal pieces that have reduced SDS content. In some embodiments, drying can be done at a temperature below 110° C. to reduce starch gelatinization. In some embodiments, such as when oil has been mixed with dry ingredients before the addition of water, or where SDS content is less of a concern, drying can be done at a temperature at or above 110° C.

In some embodiments, drying can be done at more than one temperature. For example, formed dough pieces can be dried at a lower temperature (e.g., less than 100° C.) to achieve an intermediate moisture content (e.g., less than 12%), then dried at a higher temperature (e.g., from about 100° C. to about 110° C.) to achieve a final moisture content (e.g., less than 8%). In some instances, drying at a lower temperature to achieve a moisture content lower than the leavened dough, but higher than the final moisture content, followed by drying at a higher temperature can reduce starch gelatinization by reducing moisture availability during the higher temperature drying. In some embodiments, this technique can be used to retain a desired SDS content while reducing drying time. In some embodiments, the drying step can result in toasting of the resulting RTE breakfast cereal pieces, particularly if the drying step includes drying at a temperature of at least 100° C.

Breakfast cereal pieces of a RTE breakfast cereal composition provided herein can be combined with at least one other food ingredient to produce a food product. Food ingredients can include, for example, binders, fruit, nuts, whole grain (e.g., rolled oats), confections (e.g., candy pieces or chocolate), coatings, and the like. In some embodiments, a food product can be a snack bar, a parfait (e.g., ice cream or yogurt parfait), or other food products. In some embodiments, breakfast cereal pieces can be agglomerated into clusters. In some embodiments, breakfast cereal pieces can be used as a topping to another food.

Described below are examples of methods and compositions provided herein.

EXAMPLES

Example 1

Cereal was produced by combining the dry ingredients in Table 1 with water in a single screw extruder to arrive at a dough with a moisture content of about 25%, and extruding through a 14 mm by 16 mm oval-shaped die, or a 16 mm circular die as a rope. Extruder temperature was kept at no more than 110° F., and dwell time was approximately 20 seconds. The extruded rope for each of the formulations in Table 1 was then either face cut to form small discs with a diameter of about 13 mm by 15 mm (oval) or 15 mm (round) and a thickness of about 3-5 mm, face cut with a Mafalda-like pasta die placed on the end of the extruder, or fed through a pasta machine to produce a Mafalda pasta-like shape as shown in FIG. 1. Samples were dried in two steps. The first drying step was performed in a convection tray dryer at 160° F. until the samples reached a moisture content of about 10-12%. The second drying step was performed in a fluidized bed dryer with multiple temperatures zones: zone 1 at 350° F., zone 2 at 300° F., and a cooling zone. The samples spent a total of 2.4 minutes in zones 1 and 2 before reaching the cooling zone, and reached a moisture content of about 2-3%.

TABLE 1

| | Ingredient (% by dry weight) | | | | | | | |
|---|---|---|---|---|---|---|---|---|
| Sample | Flour | Sugar | Oil | Baking Powder | Wheat Bran | Skim Milk Powder | Flavoring | Other Ingredients |
| 1 | Wheat 75.7% | 11.8% | 4% | 1.1% | 4.7% | 0% | Vanillin 0.4% | 2.3% |
| 2 | Wheat 64.6% | 10.7% | 6.8% | 1.0% | 0% | 3.7% | Cocoa Powder 7.4%; Vanillin 3.8% | 2% |
| 3 | Oat 74.3% | 11.2% | 6% | 1.0% | 5.1% | 0% | Vanillin 0.4% | 2% |

Example 2

Cereal samples from Example 1 were measured to determine bulk density and compared to several commercially available RTE cereals, a commercially available wheat pasta, as well as products sold under the brand name belVita Mixed Berry Breakfast Bites (Nabisco®). For the commercially available RTE cereals and pasta products, bulk density was determined in duplicate by filling a 100 cubic inch measuring cylinder and recording the mass. Cup density was also measured by recording the mass of the commercially available products in a filled standard measuring cup. Based on the commercially available samples, a linear regression model was developed to correlate cup density with bulk density. For samples 1 and 2 from Table 1, as well as the belVita Mixed Berry Breakfast Bites, the cup density was measured, and the bulk density was estimated based on the cup density and the linear regression model developed from the commercially available RTE cereal and pasta products. The results are shown in Table 2.

TABLE 2

| Sample | Bulk Density (g/100 in$^3$) |
|---|---|
| Commercially available puffed Kamut | 111.0 |
| Commercially available corn flakes | 171.3 |
| Commercially available puffed corn | 189.6 |
| Commercially available bran flakes | 266.1 |
| Commercially available oat pillow squares | 295.0 |
| Mafalda dry pasta | 419.2 |
| Bow tie pasta | 418.0 |
| Mafalda-like RTE sample 1 (from Table 1) | 398.1* |
| Mafalda-like RTE sample 2 (from Table 1) | 355.0* |
| Round disk-like RTE sample 1 (from Table 1) | 708.8* |
| belVita Mixed Berry Breakfast Bites | 597.6* |

*estimated value based on cup density

Samples were measured to determine piece density. Piece density was calculated in duplicate by dividing average piece mass by average piece volume determined by measuring displacement of pieces in salt. The results are shown in Table 3.

TABLE 3

| Sample | Piece Density (g/cm$^3$) |
|---|---|
| Commercially available corn flakes | 0.52 |
| Commercially available puffed corn | 0.21 |
| Mafalda dry pasta | 1.43 |
| Round disk-like RTE sample 1 (from Table 1) | 1.09 |
| Mafalda-like RTE sample 2 (from Table 1) | 1.22 |
| Mafalda-like RTE sample 1 (from Table 1) | 1.12 |
| belVita Mixed Berry Breakfast Bites | 0.81 |

Example 3

Cereal samples from Example 1, as well as several commercially available RTE cereals, and products sold under the brand name belVita Breakfast Biscuits (Nabisco®) were tested to determine SDS content using the modified Englyst method described above. The percent SDS, percent SDS by total starch, percent SDS by total carbohydrates, percent SDS by total available carbohydrates (non-fiber carbohydrates), percent rapidly available glucose (RAG), and percent slowly available glucose (SAG) are all expressed in dry weight basis and values are presented in Table 4. Total, soluble, and insoluble dietary fiber was measured by AOAC Official Method 991.43 (AOAC Official Methods of Analysis, Supplement (Mar. 1995)). Total available carbohydrate is calculated by subtracting total dietary fiber from the total carbohydrates.

TABLE 4

| Sample | % SDS by dry weight | % SDS by total starch | % SDS by total carbohydrates | % SDS by total available carbohydrates | % SAG by dry weight | % RAG by dry weight |
|---|---|---|---|---|---|---|
| Mafalda-like RTE sample 1 (from Table 1) | 19.7 | 33.1 | 26.5 | 29.1 | 21.8 | 39.8 |
| Mafalda-like RTE sample 2 (from Table 1) | 17.2 | 28.5 | 22.3 | 24.5 | 19.1 | 43.0 |
| Round disk-like RTE sample 3 (from Table 1) | 12.6 | 25.3 | 18.6 | 20.9 | 14.1 | 37.8 |
| belVita biscuit | 13.8 | 27.6 | 18.9 | 20.8 | 15.3 | 38.1 |
| Commercially available bran flakes | 2.6 | 5.8 | 3.2 | 4.0 | 2.9 | 47.9 |

Example 4

Cereal samples from Example 1, as well as several commercially available RTE cereals, and products sold under the brand name belVita Mixed Berry Breakfast Bites were tested to determine the amount of ungelatinized starch in the pieces using the DSC method described above. The results are provided in Table 5. In addition, FIG. 2 shows starch content visualized by polarized light microscopy (PLM) in a piece of a RTE cereal represented by Round disk-like RTE sample 1 (on the left) and Mafalda-like RTE sample 3 (in the middle), as compared to starch content that is not birefringent in a commercially available corn flake RTE cereal (on the right).

TABLE 5

| Sample | First Peak (Temp, in ° C.) | First Peak Enthalpy ΔH (J/g) | First Peak Area (mJ) |
|---|---|---|---|
| Commercially available corn flakes | 58.30 | 0.97 | 9.8 |
| Commercially available puffed corn | 58.61 | 0.63 | 6.4 |
| Mafalda dry pasta | 67.56 | 11.74 | 121.8 |
| Mafalda-like RTE sample 1 (from Table 1) | 69.71 | 9.28 | 94.1 |
| Mafalda-like RTE sample 2 (from Table 1) | 69.11 | 6.96 | 71.5 |
| Round disk-like RTE sample 3 (from Table 1) | 67.90 | 7.08 | 70.8 |
| belVita Mixed Berry Breakfast Bites | 67.86 | 11.53 | 118.3 |

Example 5

Cereal samples from Example 1, as well as several commercially available RTE cereals, 2 commercially available wheat pastas, and products sold under the brand name belVita Bites Mixed Berry Breakfast Bites were tested to determine the average breaking force of the pieces using the method described above. The average breaking force of the pieces are shown in Table 6.

TABLE 6

| Sample | Average Breaking Force in g (standard deviation) |
|---|---|
| Mafalda-like RTE sample 2 (from Table 1) | 748 (180) |
| Mafalda-like RTE sample 1 (from Table 1) | 577 (147) |
| Mafalda-like RTE sample 1 (from Table 1) | 476 (53) |
| Mafalda-like RTE sample 3 (from Table 1) | 429 (52) |
| Belvita Bites | 2426 (611) |
| Coated Corn Puff | 1785 (615) |
| Wheat Bran Flakes | 269 (73) |
| Corn Flakes | 299 (73) |
| Bowtie Pasta | 3523 (625) |
| Fettucini Pasta | 1630 (74) |

Example 6

Cereal samples from Example 1, as well as 2 commercially available products sold under the brand name belVita Mixed Berry Breakfast Bites and belVita Breakfast Biscuits (Nabisco®) were tested to determine the bowl life of the pieces using the bowl life test described above. The bowl life of the pieces are shown in Table 7.

TABLE 7

| Sample | Initial weight in grams | Weight in grams at 30 seconds (% weight water taken up) | Weight in grams at 60 seconds (% weight water taken up) | Weight in grams at 120 seconds (% weight water taken up) |
|---|---|---|---|---|
| Mafalda-like RTE sample 2 (from Table 1) | 50.4 | 60.1 (19%) | 62.6 (24%) | 64.6 (28%) |
| Mafalda-like RTE sample 1 (from Table 1) | 48.6 | 58.6 (21%) | 60.7 (25%) | 62 (28%) |
| Round disc-like RTE sample 1 (from Table 1) | 50.2 | 60.2 (20%) | 61.9 (23%) | 63.4 (26%) |
| Round disc-like RTE sample 3 (from Table 1) | 50.1 | 60 (20%) | 61.5 (23%) | 62.8 (25%) |
| Mafalda-like RTE sample 3 (from Table 1) | 50.3 | 64.5 (28%) | 67.9 (35%) | 71.7 (43%) |
| belVita Mini | 50.5 | 74.4 (47%) | 81.7 (62%) | 86.8 (72%) |
| belVita Biscuit | 51.3 | 84.1 (64%) | 88.8 (73%) | 91.0 (77%) |

Unless otherwise indicated, all numbers expressing feature sizes, amounts, and physical properties used in the specification and claims are to be understood as being modified in all instances by the term "about." The term "about" indicates that the identified number varies by no more than 10% (e.g., no more than 5% or no more than 1%).

The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. A method for making ready-to-eat (RTE) breakfast cereal pieces, the method comprising:
 a. combining ingredients including a flour in an amount of at least 60% by dry weight, an oil in an amount of from 3% to 8% by dry weight, a leavener in an amount of from about 1% to about 2% by dry weight, a sugar in an amount of at least 8% by dry weight, and water,
 b. mixing the ingredients at a temperature between about 10° C. and 70° C. to produce a leavened dough having a moisture content of from about 20% to 28%,
 c. forming the leavened dough into pieces, and
 d. drying the pieces to produce the RTE breakfast cereal pieces having:
  i. a slowly digestible starch (SDS) content that is at least 10% by dry weight of the pieces,
  ii. a piece density from about 1.00 g/cc to about 1.30 g/cc,
  iii. a first peak between 67° C. and 71° C. as measured by differential scanning calorimetry (DSC), and
  iv. a moisture content of less than 12%,
 wherein the RTE breakfast pieces take up less than 50% water by weight at 60 seconds as measured by a bowl life test.

2. The method of claim 1, wherein the RTE breakfast cereal pieces have a moisture content of from 8% to about 11%.

3. The method of claim 1, further comprising a step of drying the pieces at a temperature greater than 100° C. to produce RTE breakfast cereal pieces having a moisture content of less than 8%.

4. The method of claim 1, wherein the pieces are dried at an air temperature of less than 110° C.

5. The method of claim 1 wherein the RTE breakfast cereal pieces have a weight of from about 0.10 g to 0.80 g per piece.

6. The method of claim 5, wherein the RTE breakfast cereal pieces have a bulk density from about 300 g per 100 cubic inches to about 800 g per 100 cubic inches.

7. The method of claim 1, wherein SDS content is at least 20% of the total available carbohydrates in the pieces.

8. The method of claim 1, wherein the flour and oil are combined before adding water.

9. The method of claim 1, wherein the forming step is performed using a die.

10. The method of claim 1, wherein the forming step is performed without the use of a roller.

11. The method of claim 1, wherein the flour is heat treated prior to the combining step.

12. The method of claim 1, wherein the RTE breakfast cereal pieces include oat flour in an amount of at least 70% by dry weight.

13. The method of claim 1, wherein the first peak has an area greater than 60 mJ.

14. The method of claim 1, wherein the RTE breakfast cereal pieces comprise a heat sensitive component.

15. The method of claim 14, wherein the heat sensitive component is a polyunsaturated fat, a vitamin, a phytonutrient, or a beneficial microorganism.

* * * * *